March 12, 1935. C. ESAU 1,994,097
DECOY TETHERING DEVICE
Filed March 20, 1933
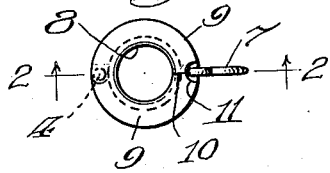
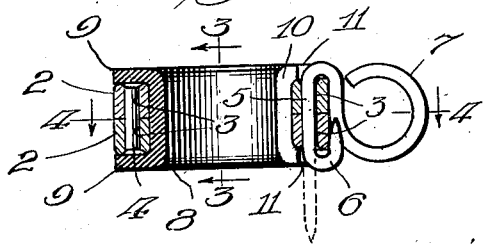
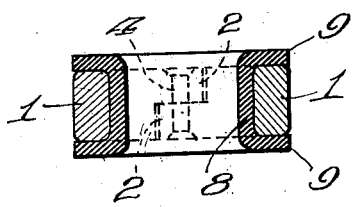
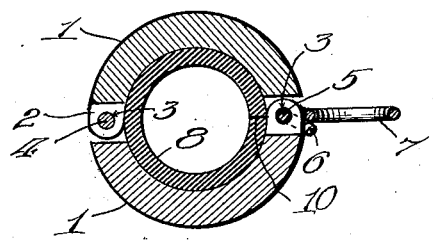
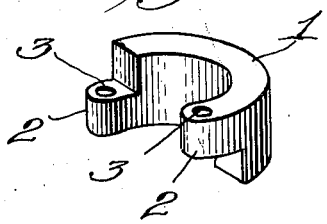
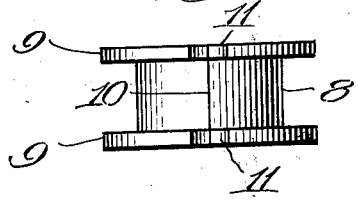
Inventor:
Charles Esau,
By Wm. F. Freudenreich,
Atty.

Patented Mar. 12, 1935

1,994,097

UNITED STATES PATENT OFFICE 1,994,097

DECOY TETHERING DEVICE

Charles Esau, Chicago, Ill.

Application March 20, 1933, Serial No. 661,725

4 Claims. (Cl. 119—128)

Many devices have been proposed, and some of them used to a certain extent, for the purpose of tethering decoy ducks or geese; but I know of none that has been wholly satisfactory, whereas some of them have been practically devices of torture.

The object of the present invention is to produce a simple and novel tethering device which can be worn on the leg of a duck or other fowl without discomfort, which will not interfere with the normal movements and actions of the wearer, and which cannot become distorted, in use, so as to injure the wearer or make it uncomfortable.

A further object of the present invention is to produce a simple and novel tethering device which shall be efficient in operation, which may be worn by a duck or other fowl while acting as a decoy or throughout an entire hunting season without causing suffering or even annoyance to the wearer, and which may be quickly and easily applied and removed.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a top plan view of a device embodying the present invention; Fig. 2 is a section, on a larger scale, on line 2—2 of Fig. 1; Fig. 3 is a section taken on line 3—3 of Fig. 2; Fig. 4 is a section on line 4—4 of Fig. 2; Fig. 5 is a perspective view of one of the half rings; and Fig. 6 is an elevation of the cushioning sleeve or lining.

Referring to the drawing, 1, 1 represent two half rings which are alike and interchangeable. A portion is cut away from each end of each half ring to a depth extending from one end face halfway to the other end face, thereby producing at each end of each half ring an ear 2. The excisions are made from opposite faces, so that one ear is at one end face of the ring and the other ear at the opposite end face. When the two halves of the ring are placed together, the meeting ears form lap joints. The ears are perforated, as indicated at 3, in directions parallel with the axis of the ring; the perforations in overlapping ears, when the two halves of the ring are assembled, registering with each other. A hinge pin 4 extends through the registering openings or perforations at one of the joints; the ends of this hinge pin being riveted over or otherwise fashioned so as to keep the pin in place while serving as a hinge pin or pintle that permits the opposite ends of the half rings to be swung from and toward each other. When the free ends of the two half rings or sections are brought together and a pin is inserted in the registering openings therein, the half rings or sections are locked together to produce a rigid continuous ring. The locking pin that I employ is preferably made of wire and comprises the pin proper 5, one end of which may be bent back upon itself into the form of a hook 6, after the pin proper in a straight condition has been inserted. The wire at the opposite end of the body portion of the locking pin is continued beyond the ring and is bent into the form of a loop or eye 7 lying directly outwardly from the ring beside the periphery; the loop or eye lying preferably in a plane that contains the long axis of the ring. Furthermore, the loop or eye preferably has a diameter about as great as the axial length of the ring, or perhaps somewhat greater, and it is so disposed that the center thereof lies approximately in the transverse plane containing the meeting faces of the ears that form the lap joints. A line or cord is attached to the ring by being passed through the loop or eye and, by locating this loop or eye as I have done, the pull of the line will not tend to tilt or clamp the ring on the leg of the wearer while the line is parallel with the plane of the ring. This is true whether the line be passed through the loop or eye, or whether it be attached to the latter by means of a snap hook.

In order to apply the ring to the leg of a duck or other fowl, the two halves are simply swung apart, the leg is inserted between them, and the two halves are then swung together and the locking pin is inserted. The free end of the locking pin is then bent up by means of a pair of pliers or otherwise, and the ring thereby becomes positively locked upon the leg. When it is desired to remove the ring, all that it is necessary to do is to straighten out the bent end of the locking pin and pull the pin out.

The ring is preferably made of aluminum so that it will be light in weight even though it is made thick enough and long enough to be quite sturdy and rigid. Since the ring is rigid and strong, it cannot easily be deformed so as to exert a clamping action on the leg of the duck or the like and, since it is made of a body of considerable cross-sectional area, the corners may be effectively rounded so as to leave no sharp corners that can dig or cut into the skin. I prefer, however, still further to reduce the likelihood that the wearing of the ring will cause injury or even discomfort or annoyance to the duck, and I therefore preferably face the parts of the ring that can come in contact with the leg with a suitable cushioning material. Soft rubber serves very well as a cushioning material for this purpose, and it permits the facing or lining to be embodied in a form that will make the facings or linings readily replaceable. In the arrangement shown, the cushioning device is in the form of a sleeve 8 of soft rubber having at the ends flanges 9. The body portion of the sleeve fits within the ring and it is of the same length as the axial length of the ring so that the flanges overlie and engage with the two end faces of the ring. The rubber sleeve is preferably divided lengthwise along one side, the dividing line being indicated at 10 in Fig. 6; whereby the meeting ends may be spread apart when the ring is opened to permit the entry of a leg into or the removal of a leg from the device. If the flanges of the rubber sleeve are made wide enough to cover the end faces of the ring, a notch 11 may be cut into the edge of each of the flanges, one directly above the other, to enable the flanges to clear the locking pin. If these notches are placed at the line of division in the sleeve, the locking pin will serve to hold the sleeve against turning so that, in case the ring is opened, the sleeve may also be opened, with the gap in the sleeve registering with that in the ring.

The hinge pin and the locking pin are preferably made of brass or other rustproof material.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. A device of the character described, comprising a rigid ring composed of sections, and means including a hinge pin and a wire locking pin securing said sections together, said locking pin extending through the free ends of said sections, the wire at one end of said locking pin extending in a loop or eye beside the periphery of the ring.

2. A device of the character described, comprising a rigid ring composed of two like interchangeable sections, and means including a hinge pin and a locking pin securing said sections together, one end of said locking pin terminating in an eye lying beside the periphery of the ring in a plane at right angles to the plane of the ring.

3. A device of the character described, comprising two similar interchangeable rigid aluminum half rings shaped at the ends to form lap joints, a hinge pin extending through one of the joints and permanently secured to the ring, a second pin of bendable material extending through the other joint, one end of said second pin being in the form of an eye lying beside the periphery of the ring, and the other end of said second pin being bent back upon itself across the periphery of the ring.

4. A device of the character described, comprising two similar interchangeable rigid aluminum half rings shaped at the ends to form lap joints, a hinge pin extending through one of the joints and permanently secured to the ring, a second pin of bendable material extending through the other joint, one end of said second pin being in the form of an eye lying beside the periphery of the ring, the other end of said second pin being bent back upon itself across the periphery of the ring, and a divided sleeve of soft rubber fitting within said ring and having flanges overlapping both end faces of the latter.

CHARLES ESAU.